US011876320B2

(12) United States Patent
Peterson et al.

(10) Patent No.: US 11,876,320 B2
(45) Date of Patent: Jan. 16, 2024

(54) HINGED SEAL CAP

(71) Applicant: TE Connectivity Services GmbH, Schaffhausen (CH)

(72) Inventors: Kevin John Peterson, Winston Salem, NC (US); Clara Rhodes, Winston Salem, NC (US); Hurley Chester Moll, Middletown, PA (US)

(73) Assignee: TE Connectivity Solutions GmbH

( * ) Notice: Subject to any disclaimer, the term of this patent is extended or adjusted under 35 U.S.C. 154(b) by 0 days.

(21) Appl. No.: 17/587,426

(22) Filed: Jan. 28, 2022

(65) Prior Publication Data

US 2022/0247117 A1 Aug. 4, 2022

Related U.S. Application Data

(60) Provisional application No. 63/145,629, filed on Feb. 4, 2021.

(51) Int. Cl.
*H01R 13/52* (2006.01)

(52) U.S. Cl.
CPC ................................ *H01R 13/5208* (2013.01)

(58) Field of Classification Search
CPC ............ H01R 13/5208; H01R 13/5221; H02G 15/013; H02G 15/113
See application file for complete search history.

(56) References Cited

U.S. PATENT DOCUMENTS

| | | | | |
|---|---|---|---|---|
| 6,331,124 | B1 * | 12/2001 | Miyazaki | H01R 13/5208 439/587 |
| 9,632,268 | B2 * | 4/2017 | Coenegracht | G02B 6/4444 |
| 10,116,085 | B1 * | 10/2018 | Quinteros | H01R 13/5825 |

* cited by examiner

*Primary Examiner* — Vanessa Girardi

(57) ABSTRACT

A cap for an electrical connector comprises a first cap body defining a first portion of a first circular opening, and a second cap body defining a second portion of a first circular opening. The second cap body is hingedly connected to the first cap body and movable between an open position and a closed position. In the closed position, first and second portions of the first cap body and the second cap body define a circular opening sized to receive a conductive cable therethrough.

20 Claims, 10 Drawing Sheets

HINGED SEAL CAP

CROSS-REFERENCE TO RELATED APPLICATIONS

This application claims priority to U.S. Provisional Application No. 63/145,629, filed on Feb. 4, 2021, the entire disclosure of which is incorporated by reference herein.

FIELD OF THE INVENTION

The present disclosure relates to electrical connectors, and more specifically, to improved systems for selectively sealing wire openings of an electrical connector, such as a charging receptacle or inlet of an electric vehicle (EV).

BACKGROUND

It is often desired to seal electrical connectors that are subject to harsh environments, thereby ensuring that dirt, moisture and other contaminants do not enter the contact area of the connector. For example, EVs are increasing in popularity as their practicality and usability improves. In order to fulfill consumer requirements for both personal and commercial applications, associated systems and components of these vehicles must be continuously optimized to extract maximum performance, usability and reliability. One critical aspect of EV usability includes the ability to consistently charge its batteries as quickly as possible over the life of the vehicle. In this way, it is desired to minimize any degradations in charging performance. Charging performance can be affected by any number of factors, including moisture, dirt and other debris contaminating and/or degrading the electrical terminals or contacts of the charger plug or the socket/receptacle of the EV. Thus, it is desired to shield these sensitive surfaces and/or components from the outside environment.

SUMMARY

In one embodiment of the present disclosure, a cap for an electrical connector comprises a first cap body defining a first portion of a first circular opening, and a second cap body defining a second portion of the first circular opening. The second cap body is hingedly connected to the first cap body and is movable between an open position and a closed position. In the closed position, the first and second portions of the first cap body and the second cap body define a circular opening sized to receive a conductive cable therethrough.

BRIEF DESCRIPTION OF THE DRAWINGS

The invention will now be described by way of example with reference to the accompanying Figures, of which.

DETAILED DESCRIPTION OF THE EMBODIMENTS

Figure 1:
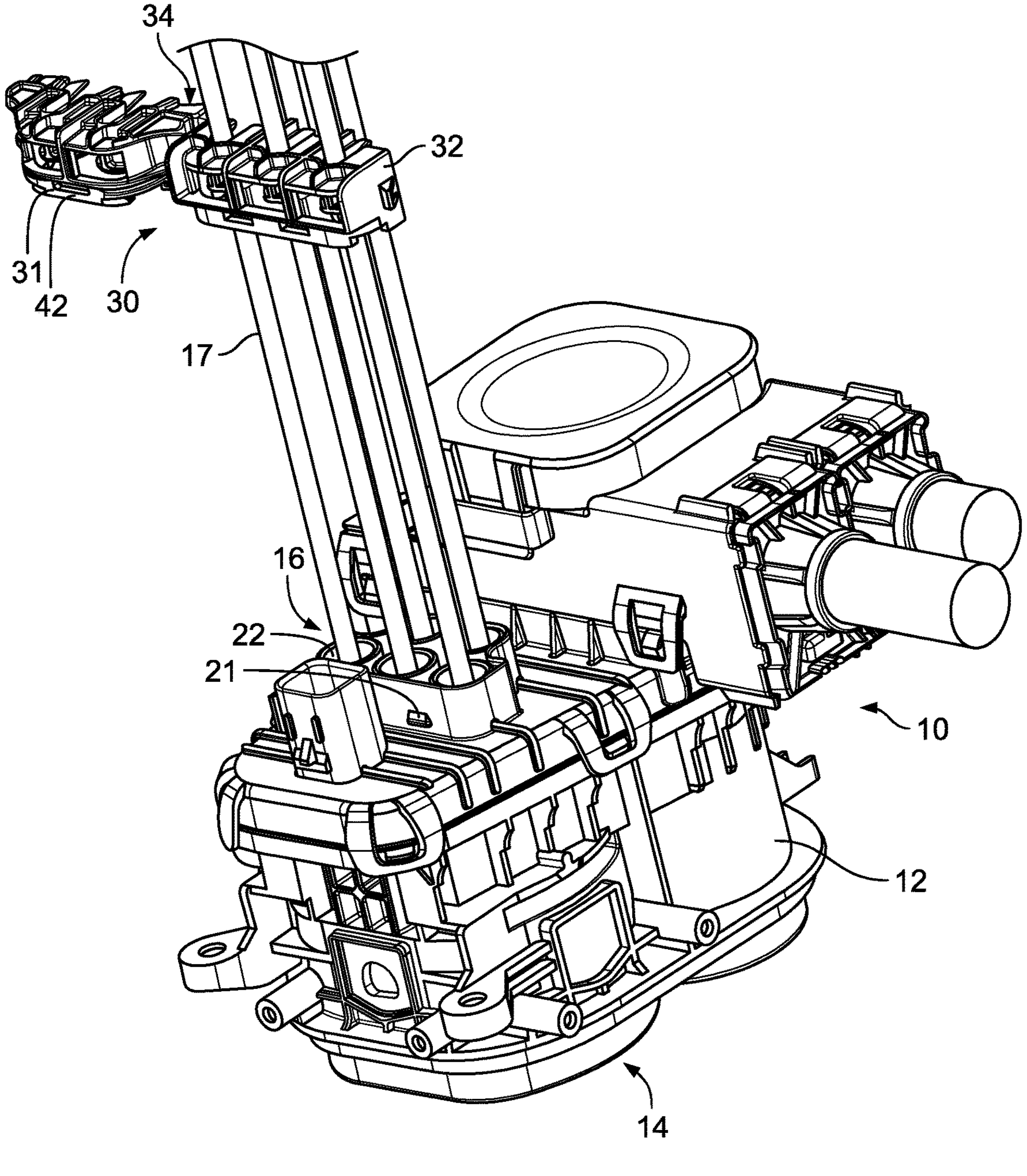
FIG. 1 is a perspective view of an electrical connector and a hinged seal cap in an open position according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure provide a single seal cap which may be used to cover a plurality of cable or wire openings of an electrical connector simultaneously. Further, the seal cap is able to be fitted to the cables and the connector after the cables have been installed within a connector or otherwise connectorized. Specifically, in one embodiment of the present disclosure, a seal cap for an electrical connector comprises a first cap body defining a first portion of a plurality of circular openings, and a second cap body defining a second portion of the plurality of circular openings. The second cap body is hingedly connected to the first cap body and movable between an open position and a closed position. In the closed position, first and second portions of the first cap body and the second cap body define the plurality of circular openings, each sized to receive a conductive cable therethrough.

Figure 2:
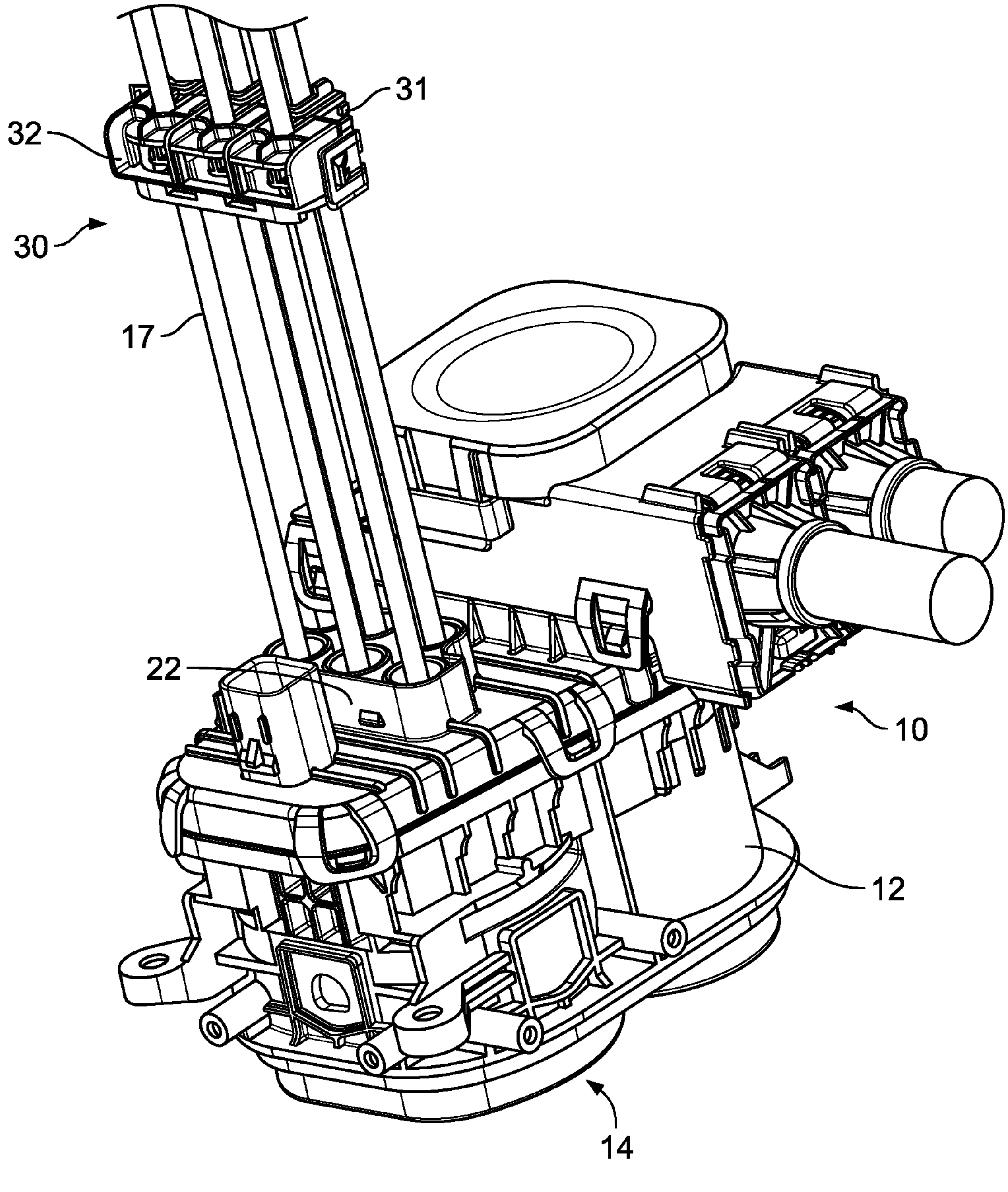
FIG. 2 is a perspective view of the connector and the hinged seal cap in a closed position capturing a plurality of cables therethrough.
Figure 3:
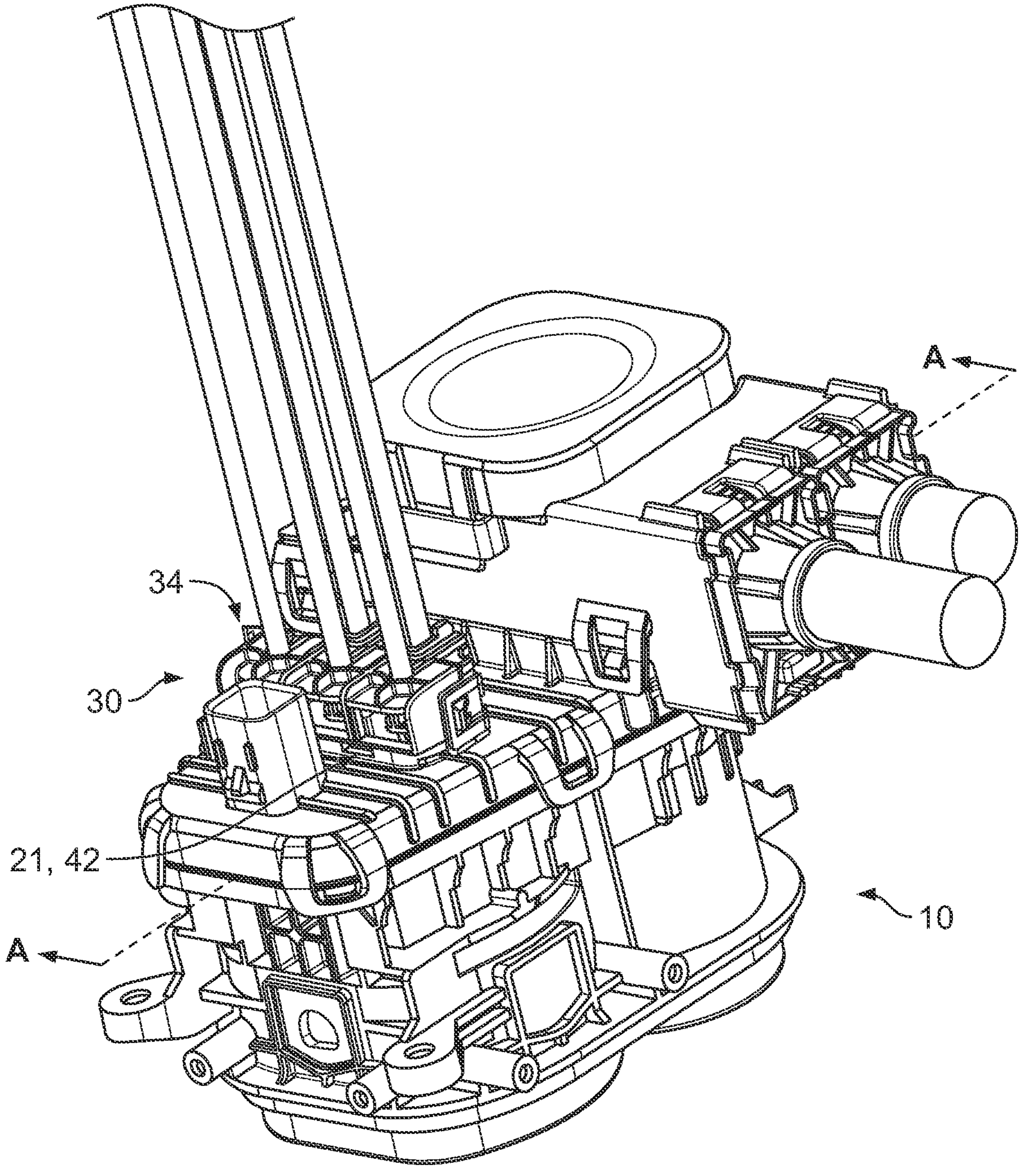
FIG. 3 is a perspective view of the connector with the hinged seal cap in an installed position thereon.
Figure 4:
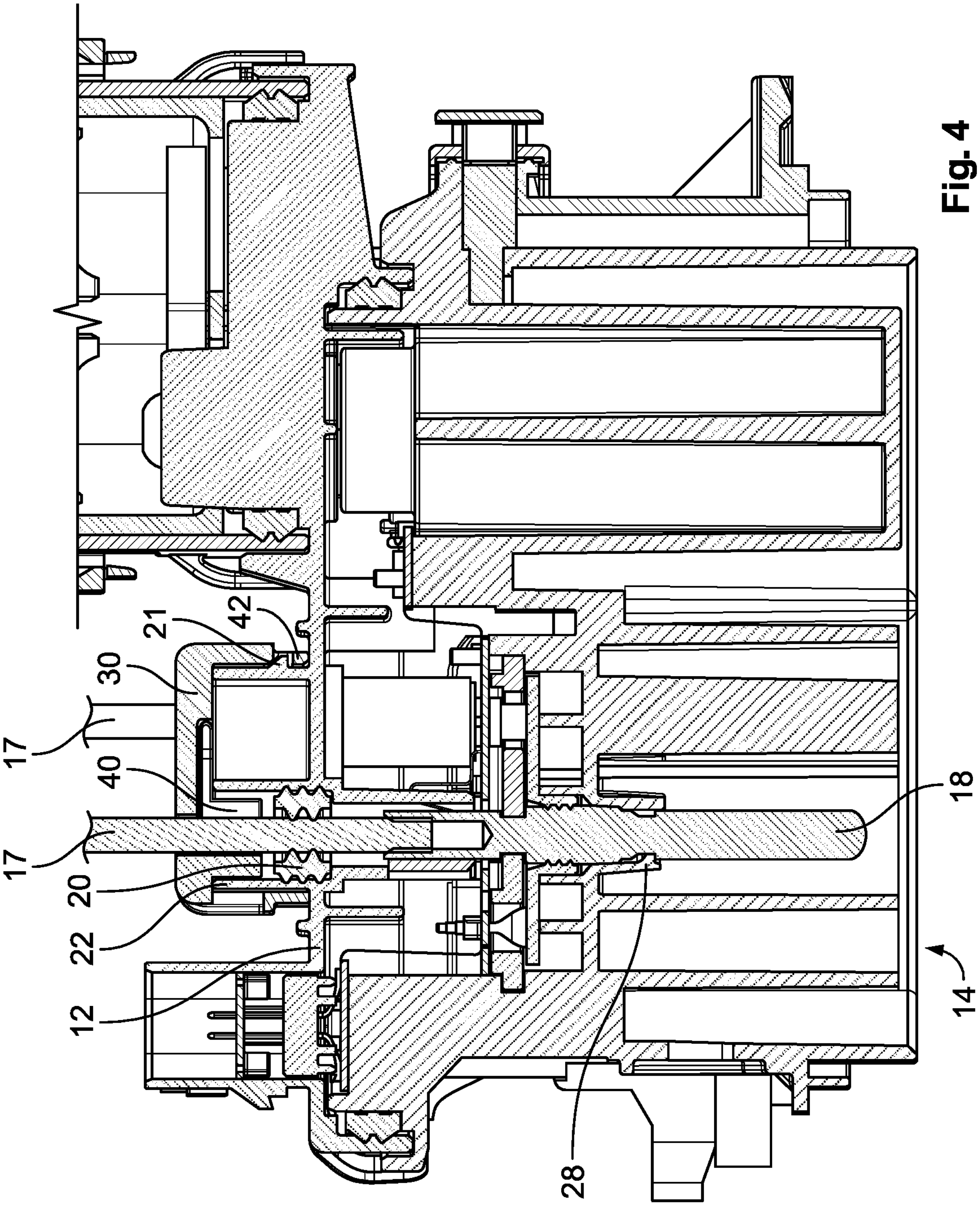
FIG. 4 is a side cross-sectional view of the connector with the hinged seal cap in the installed position taken along section A-A of FIG. 3.

Referring to FIGS. 1-4, embodiments of the present disclosure are shown and described in use with an exemplary electrical connector 10 (e.g., a charging receptacle or inlet for an electric vehicle). The exemplary electrical connector 10 includes a housing 12 defining a front opening 14 for receiving a portion of a mating connector or a mating terminal (e.g., a charging plug, not shown) in a mating direction. The housing 12 further includes a plurality of rear openings 16 (e.g., five) each receiving a conductive cable or wire 17 and/or an electrical terminal 18 for mating with the corresponding mating connector or terminal, as shown in FIG. 4. Still referring to FIG. 4, the terminal 18 may be crimped onto an end of the cable 17 prior to its insertion into the housing 12. The terminal 18 is installed into the rear opening 16 of the housing 12 in an insertion or installation direction, generally opposite to the mating direction. In this way, the terminal 18 may be described as being "rear-loaded" within the connector housing 12. The housing 12 further defines a terminal latch 28 for engaging with an annual groove of the terminal 18 in an installed position. The terminal latch 28 forms a mechanical stop for fixing the insertion distance of the terminal 18 within the housing 12, as well as preventing its removal. An annular cable seal 20 is provided within each rear opening 16 for forming a seal between the cable 17 and an inner face of a protruding wall 22 of the housing 12 defining the rear opening.

A seal cap 30 according to embodiments of the present disclosure is adapted to be selectively secured onto at least one, and in the exemplary embodiment five, cable(s) 17 simultaneously. The cap 30 comprises a split body configuration, including first and second cap bodies or portions 31,32 which are hingedly connected and movable between an open position as shown in FIG. 1, and a closed position as shown in FIGS. 2-4. Each cap body 31,32 defines a portion of a plurality of cable openings. In this way, the cap 30 may be fitted over the cables 17 after their insertion into the exemplary connector 10, or after the application of other connectorization (e.g., terminals 18). Once fitted over the cables 17, the cap 30 is secured to the rear of the housing 12 of the connector 10 via corresponding locking features 21,42, such as complementary snap-fit latches 42 and catches 21. As shown in FIG. 4, a plurality of cylindrical seal retainers 40 defined by the cap 30 are received within the rear openings 16 for holding and/or retaining each of the cable seals 20 within their respective opening. Once installed, the cap 30 provides protection against, for example, dirt, debris and fluid (including high-pressure spray) from entering the connector 10. The cap 30 also provides strain relief for the cables 17.

Figure 7:
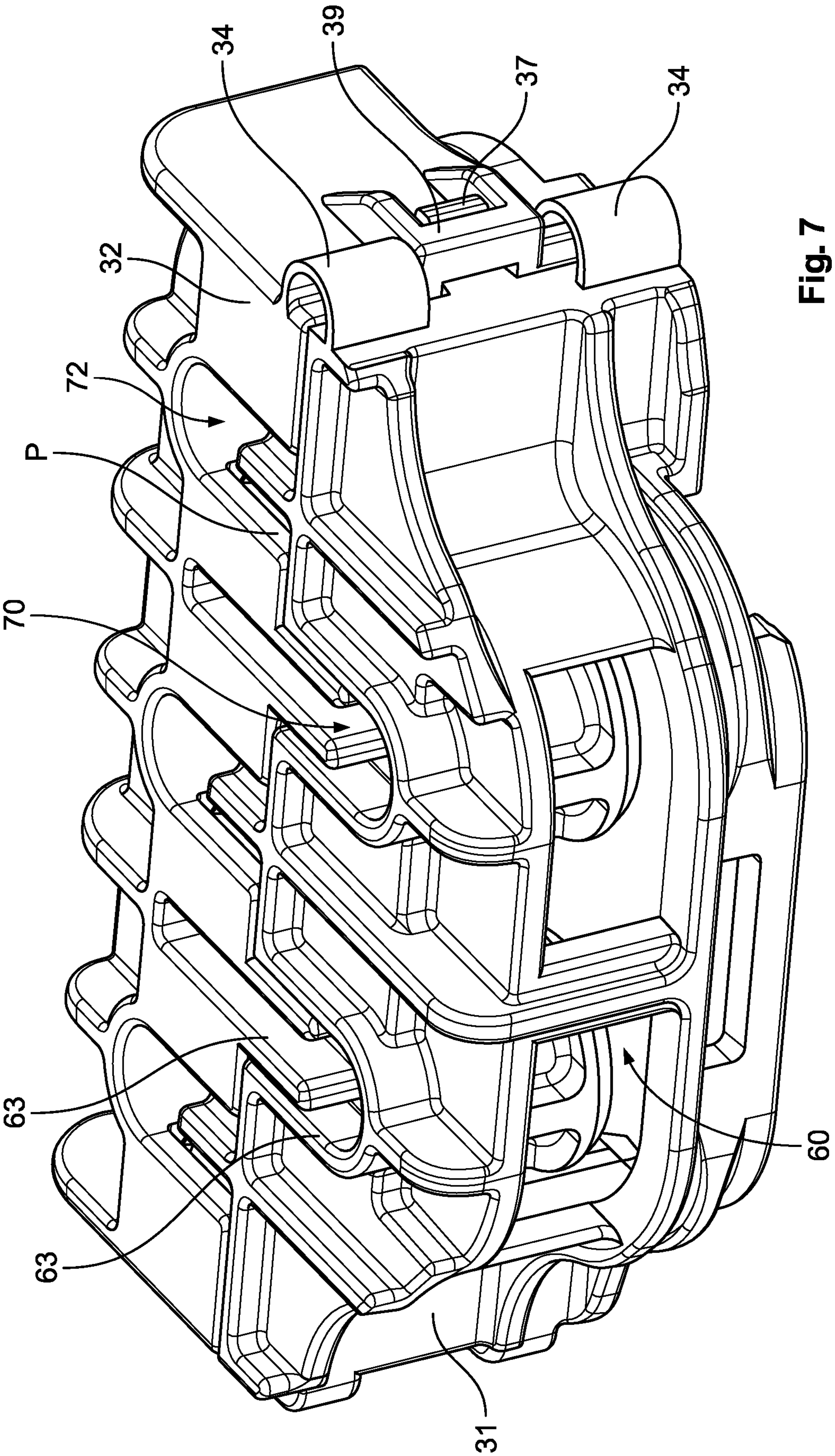
FIG. 7 is a top perspective view of the hinged seal cap in the closed position.

Referring now to FIGS. 5-11, the first body or body half 31 and the second body half 32 are hingedly or pivotally connected to one another by a connection 34. In one embodiment, the connection 34 comprises a rotating assembly including an axle, such as a pin, and corresponding female portion rotatably receiving the axle. In the exemplary illustrated embodiment, the connection 34 comprises a hinge, and more specifically, a living hinge formed integrally with the first and second bodies 31,32. As shown in FIG. 7, in the closed position, the connection or living hinge 34 is elastically deformed into an arcuate shape.

Each first and second body 31,32 further includes a first locking mechanism, such as a latch 36 formed on the first body and a catch 38 formed on the second body. The locking features 36,38 cooperate to selectively fix the first and second bodies 31,32 in the closed position, as shown in FIGS. 7-11. A second locking mechanism, such as an "L-shaped" cantilevered latch 37 and a catch 39, are arranged on sides of the first and second bodies 31,32 proximate the connection 34. The latch 37 and catch 39 engage in the closed position of the cap 30 for ensuring the first and second bodies 31,32 are tightly secured proximate the hinged connection 34. Further, in the event of a failure of the connection 34 (e.g., a fatigue failure of the hinge), the second locking features or mechanism ensure the functionality of the cap 30. As shown most clearly in FIG. 7, in the exemplary embodiment, the hinged connection 34 is split into upper and lower halves or portions in order to accommodate the secondary locking features therebetween.

Figure 5:
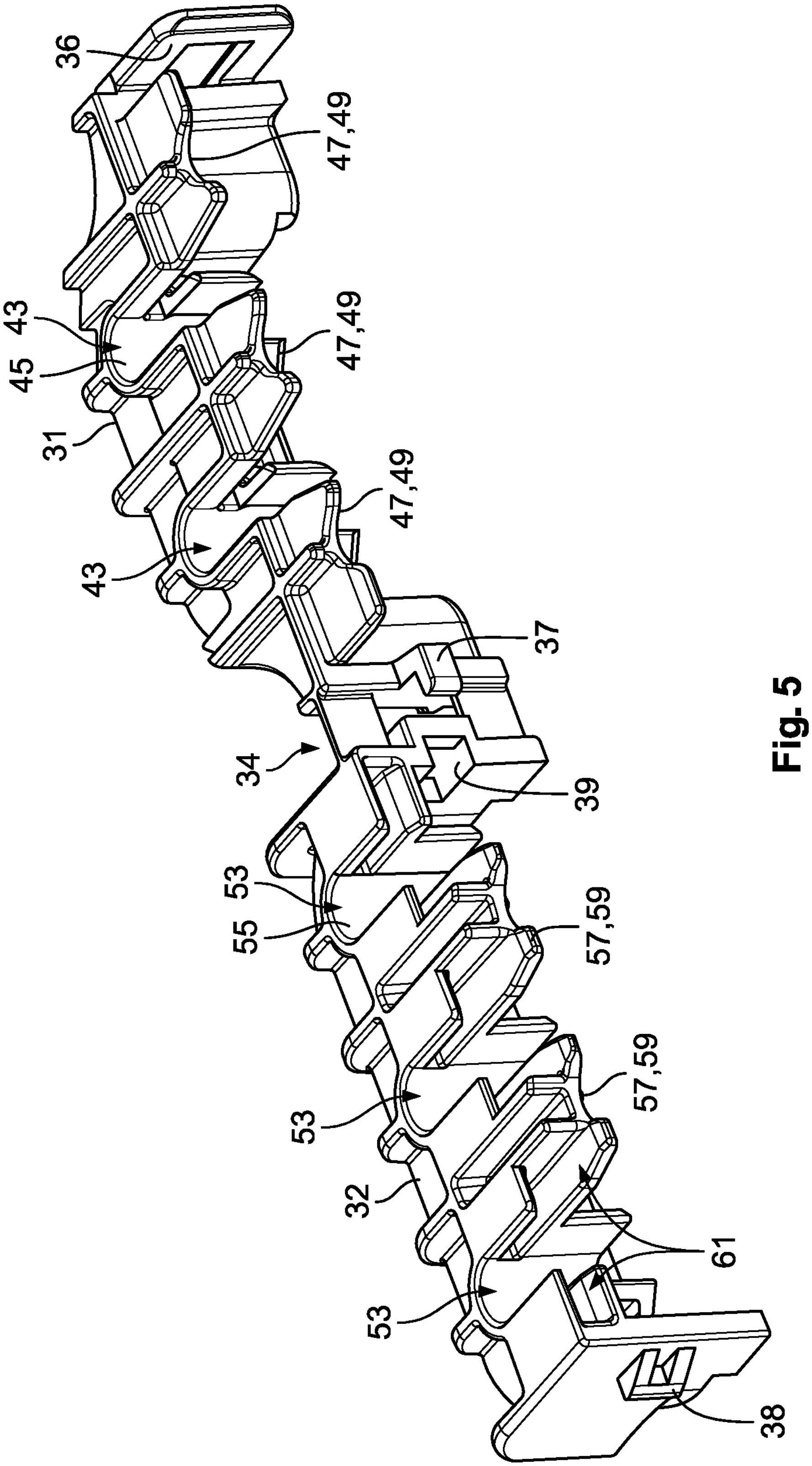
FIG. 5 is a top perspective view of the hinged seal cap in the open position.
Figure 6:
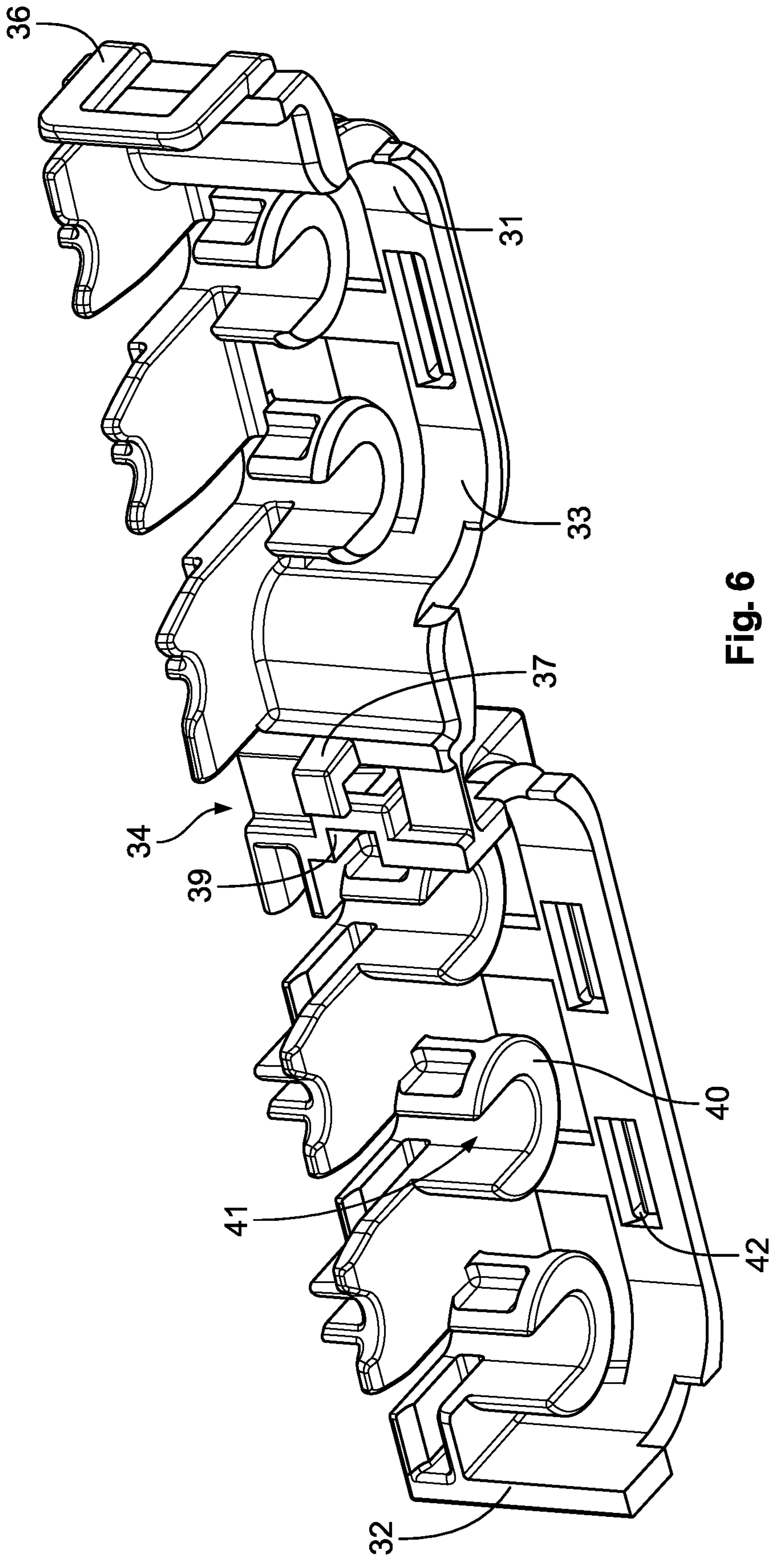
FIG. 6 is a bottom perspective view of the hinged seal cap in the open position.

With particular reference to FIG. 5, the first body defines 31 a plurality of cable receiving slots 43. Each cable receiving slot 43 has an end defining a portion of a circle, or a semi-circular lower end 45. Likewise, the first body 31 defines a plurality of cable retaining protrusions 47. Each cable retaining protrusion 47 defines a portion of a circle, or a semi-circular end 49. In the exemplary embodiment, each cable slot 43 is arranged between adjacent retaining protrusions 47. Likewise, the second body 32 defines a plurality of cable receiving slots 53. Each cable receiving slot 53 includes an end defining a portion of a circle, or a semi-circular lower end 55. The second body 32 further defines a plurality of cable retaining protrusions 57. Each cable retaining protrusion 57 defines a portion of a circle, or a semi-circular end 59. Each cable retaining protrusion 57 is arranged between adjacent cable slots 53. As shown, the number of cable slots 43 of the first body corresponds to the number of cable retaining protrusions 57 of the second body. Likewise, the number of cable retaining protrusions 47 of the first body 31 corresponds to the number of cable slots 53 of the second body 32. The cable receiving slots 43,53 are formed into respective first and second cap bodies 31,32 in cable receiving directions. Similarly, each cable retaining protrusion 47,57 extends from the cap bodies 31,32 in directions opposite to the cable receiving directions.

Still referring to FIG. 5, the cable retaining protrusions 47,57 may be embodied as single-walled, or generally planar, tabs. The cable receiving slots 53 define lateral channels 61 on either side of the slots for receiving the lateral ends of each cable receiving protrusion 47. In the exemplary embodiment, the cable retaining protrusions 57 of the second body 32 define a lower wall of each of the channels 61. Accordingly, in the closed position, the bodies 31,32 are supported against relative axial movement via the engagement of the protrusions 47 within the slots 61.

Figure 8:
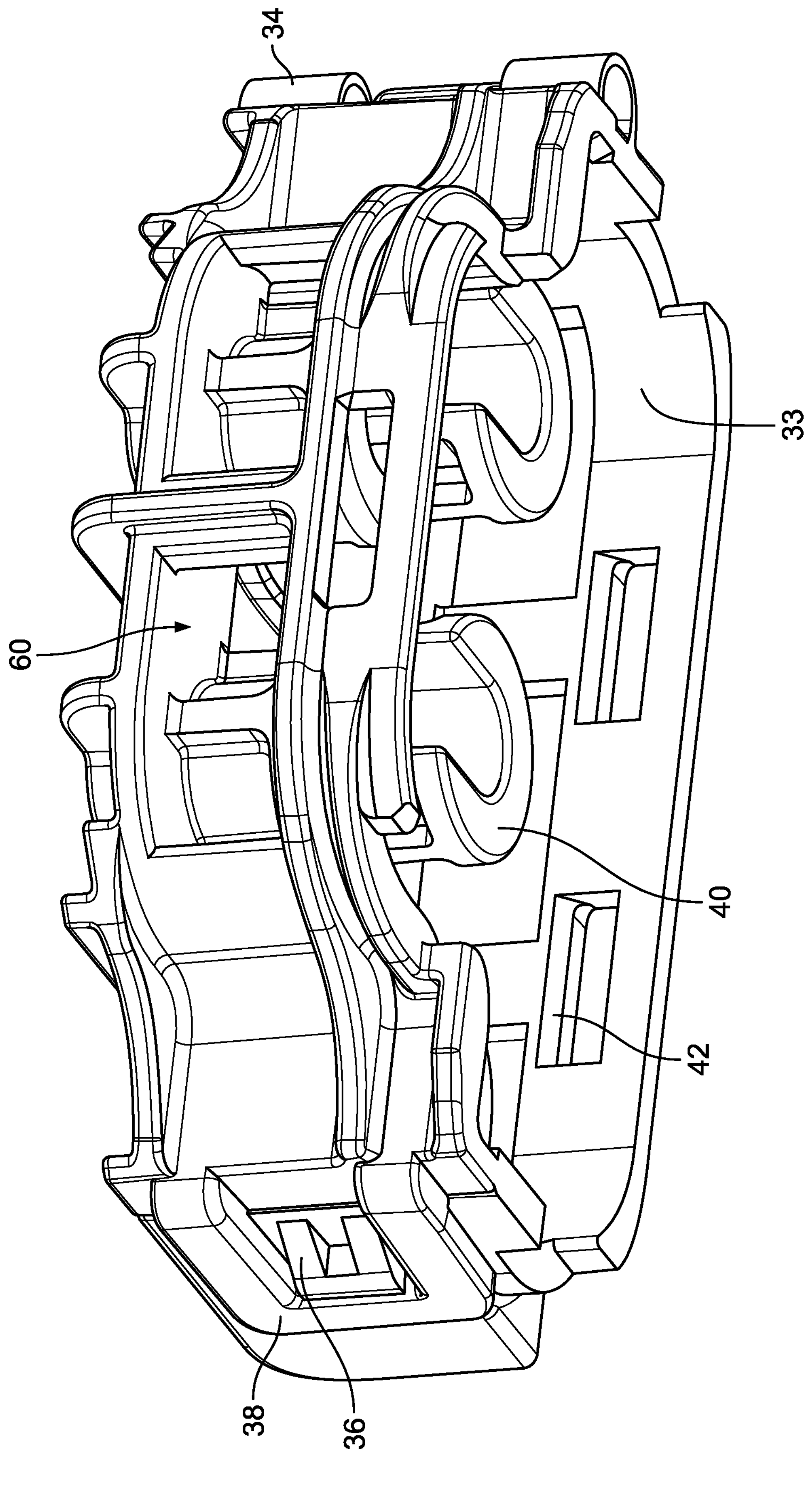
FIG. 8 is a bottom perspective view of the hinged seal cap in the closed position.

As shown most clearly in FIG. 8, in the closed position the first cap body 31 and the second cap body 32 form a continuous peripheral wall 33 defining an internal cavity. The seal retainers 40 are formed within the cavity, and extend in an axial direction from an underside of each of the cable slots 43,53. See also FIG. 6. The seal retainers 40 define at least partially cylindrical, hollow protrusions extending from an underside of one of the first cap body 31 or the second cap body 32. In the exemplary embodiment, each seal retainer 40 extends at least 270 degrees in a radial direction, and defines a slotted opening 41 in the radial direction sized to accept the cable 17 therethrough. As shown in FIG. 4, with the seal cap 30 connected to the connector housing 12, the seal retainers 40 extend from the seal cap in a direction toward the connector housing.

Figure 9:
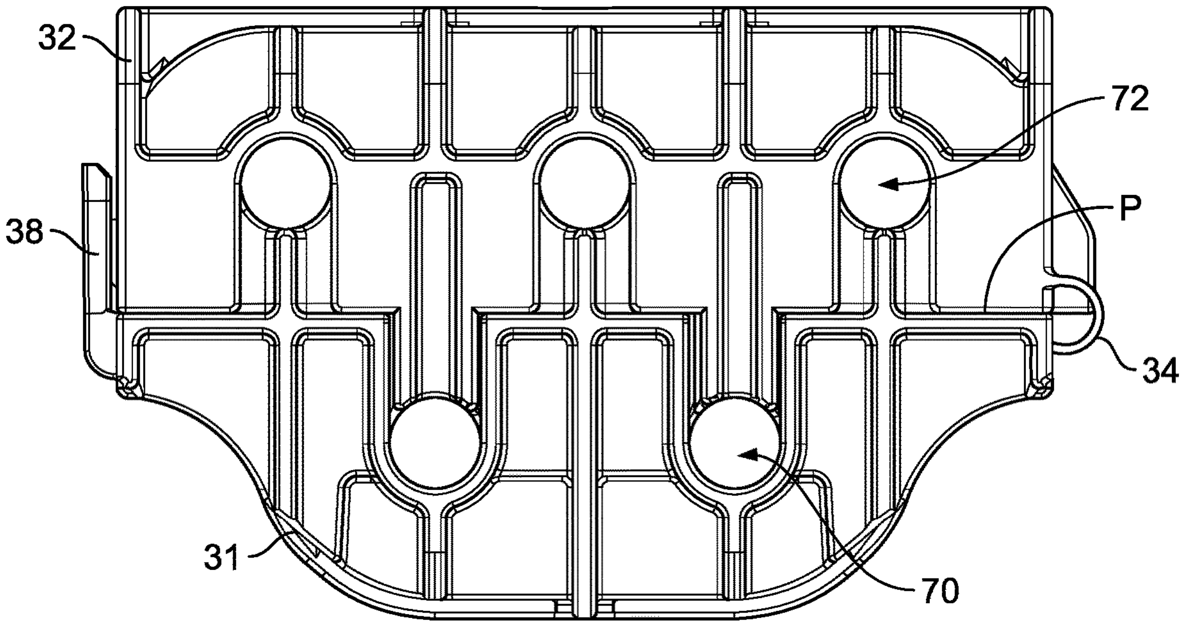
FIG. 9 is a top view of the hinged seal cap in the closed position.
Figure 10:
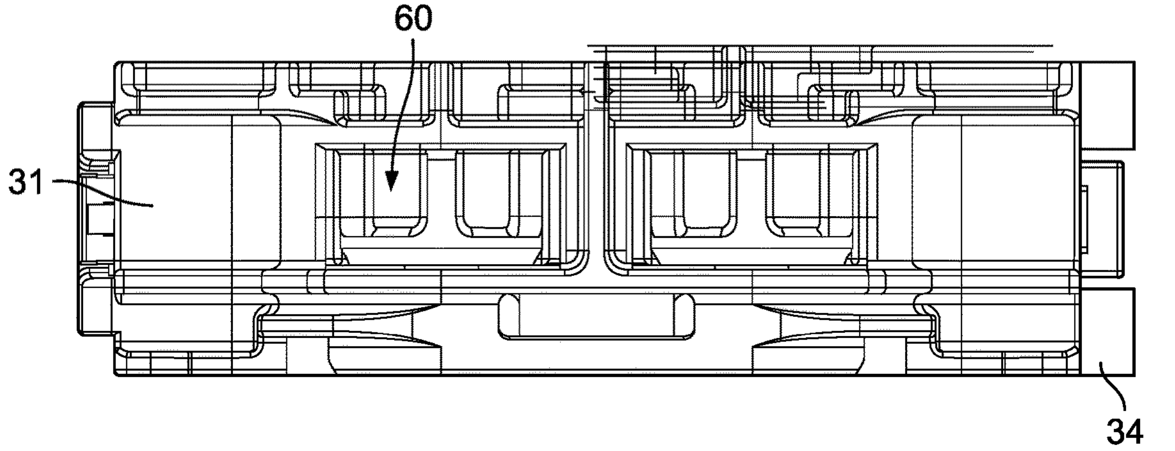
FIG. 10 is a side view of the hinged seal cap in the closed position.
Figure 11:
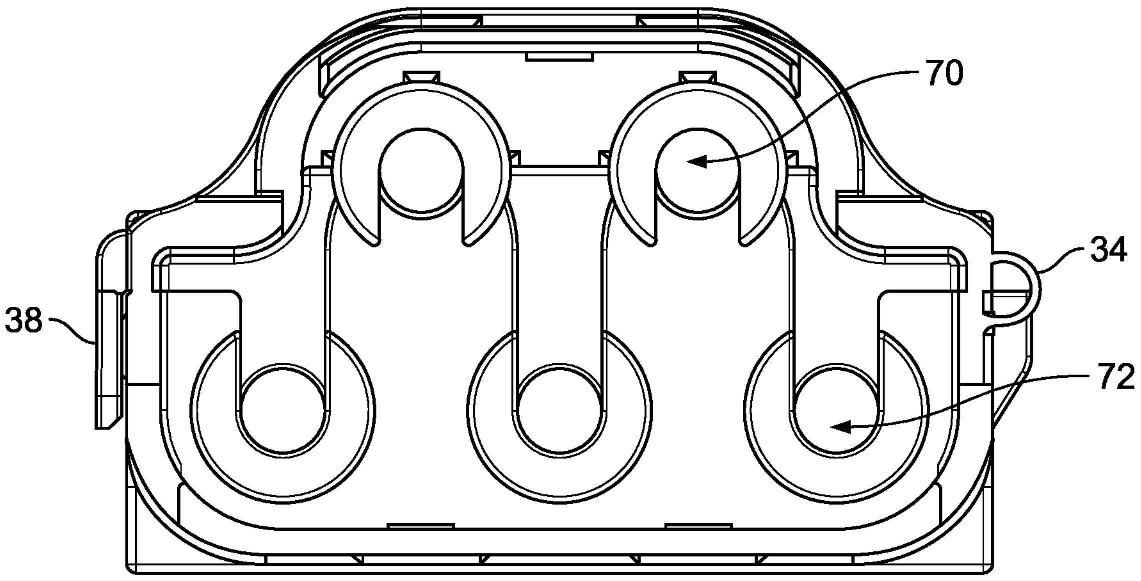
FIG. 11 is a bottom view of the hinged seal cap in the closed position.

As shown in FIGS. 7-11, in the closed position, the first and second bodies 31,32 are joined along a part line P. The cable receiving slots 43 of the first body 31 and the cable receiving protrusions 57 of the second body 32 cooperate to define a first plurality of closed circular openings 70 (e.g., two openings), and the cable receiving protrusions 47 of the first body and the cable receiving slots 53 of the second body cooperate to define a second plurality of closed circular openings 72 (e.g., three openings). Each seal retainer 40 is coaxially aligned with a respective one of the openings 70,72. The openings 70,72 are arranged in respective first and second rows across a width of the cap 30, as shown in FIGS. 9 and 11.

Windows or openings 60 may be defined in either or both of the first and second bodies 31,32, and specifically the peripheral wall 33 thereof, to provide visual and/or physical access to captured cables 17. Complementary stiffening ribs 63 may be defined on the outer surfaces of each of the first and second bodies 31,32 for strengthening the cap 30. In the exemplary embodiment, the stiffening ribs 63 of the first and second bodies 31,32 may overlap in a width direction with the cap 30 in the closed position, as shown in FIGS. 7 and 9.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A seal cap for an electrical connector, comprising:

a first cap body including a plurality of first cable receiving slots, each first cable receiving slot defining a first portion of a respective one of a plurality of openings; and a second cap body hingedly connected to the first cap body and including a plurality of first cable retaining protrusions, each first cable retaining protrusion defining a second portion of a respective one of the plurality of openings, the second cap body pivotable relative to the first cap body between an open position and a closed position, in the closed position:

the first cable retaining protrusions cooperate with the first cable receiving slots for defining the plurality of openings, the plurality of openings are each sized to receive a conductive cable therethrough; and each first cable retaining protrusion is arranged at least one of under or over one of the first cable receiving slots in an axial direction of one of the plurality of openings defined thereby.

2. The seal cap according to claim 1, wherein the first cap body further comprises a second cable retaining protrusion and the second cap body defines a second cable receiving slot, the second cable retaining protrusion and the second cable receiving slot defining a second opening with the first and second cap bodies in the closed position.

3. The seal cap according to claim 2, wherein first cable receiving slots and the second cable retaining protrusion extend in opposite directions from the first cap body.

4. The seal cap according to claim 1, further comprising a first locking mechanism for selectively fixing first ends of the first cap body and the second cap body in the closed position.

5. The seal cap according to claim 4, further comprising a second locking mechanism for selectively fixing second ends of the first cap body and the second cap body in the closed position.

6. The seal cap according to claim 1, wherein a central axis of each opening of the plurality of openings is parallel to a pivoting axis defined by a hinged connection between the first cap body and the second cap body.

7. The seal cap according to claim 6, wherein the hinged connection comprises a living hinge defined between the first cap body and the second cap body.

8. The seal cap according to claim 1, further comprising a plurality of seal retainers extending from at least one of the first cap body and the second cap body, each seal retainer having a central axis coaxially aligned with one of the plurality of openings.

9. The seal cap according to claim 8, wherein in the closed position, the first cap body and the second cap body define a cavity formed by a continuous perimeter wall extending in an axial direction of the plurality of openings, the seal retainers formed in the cavity.

10. The seal cap according to claim 9, wherein each seal retainer defines an at least partially cylindrical protrusion extending from an underside of one of the first cap body or the second cap body in a direction away from the plurality of openings, each seal retainer offset from a respective one of the plurality of openings in the axial direction.

11. The seal cap according to claim 10, wherein each seal retainer defines a slot formed therethrough in a radial direction for receiving a conductive cable in the radial direction.

12. A connector assembly, comprising:

a connector housing including a plurality of cable openings each sized to receive a conductive cable therethrough in an axial direction;

a plurality of seals, each of the plurality of seals arranged within a respective one of each of the plurality of cable openings and sized to create a seal between the cable opening and a conductive cable received therethrough; and a seal cap removably connected to the connector housing, including:

a first cap half including a plurality cable receiving slots, each cable receiving slot defining a first portion of a respective one of a plurality of first openings each sized to receive a conductive cable therethrough; and a second cap half hingedly connected to the first seal cap half and including a plurality of cable retaining protrusions, each cable retaining protrusion defining a second portion of a respective one of the plurality of first openings, the second cap half pivotable relative to the first cap half between an open position and a closed position, in the closed position each of the cable retaining protrusions cooperates with a respective one of the cable receiving slots for defining each of the plurality of first openings; and a plurality of seal retainers, each seal retainer extending into one of the cable openings in the axial direction from an underside of the seal cap and opposing the seal in the axial direction with the seal cap fitted to the connector housing.

13. The connector assembly according to claim 12, wherein in the closed position, the first cap half and the second cap half define a cavity formed by a continuous perimeter wall extending in an axial direction of the plurality of circular openings, the plurality of seal retainers extending from within the cavity in a direction toward the connector housing, a circumferential wall of the connector housing defining each cable opening extending into the cavity with the seal cap connected to the connector housing.

14. The connector assembly according to claim 12, wherein each of the plurality of seals comprises an annular seal and each of the plurality of seal retainers comprises an at least partially cylindrical protrusion, each of the plurality of seal retainers blocking a respective one of the plurality of seals from being removed from a respective one of the plurality of cable openings in the axial direction with the seal cap fitted to the connector housing.

15. The connector assembly according to claim 12, wherein the seal cap is removable from the connector housing independently of the plurality of seals such that disconnection and removal of the seal cap from the connector housing does not remove the plurality of seals from the plurality of cable openings of the connector housing.

16. A seal cap for an electrical connector, comprising:

a first body including at least one first cable receiving slot formed therethrough and at least one first cable retaining protrusion, the first cable receiving slot defined into the first body in a first cable receiving direction, the first cable retaining protrusion extending from the first body in a direction opposite the cable receiving direction;

a second body hingedly connected to the first body and defining a second cable receiving slot therethrough and at least one second cable retaining protrusion, the second cable receiving slot defined into the second body in a second cable receiving direction, and the second cable retaining protrusion extending from the second body in a direction opposite the second cable receiving direction, the first body movable relative to the second body between an open position in which the first and second cable receiving slots are open on an end thereof, and a closed position in which the first and second cable retaining protrusions engage with the second cable receiving slot and the first cable receiving slot, respectively, for closing the ends of the first and second cable receiving slots, in the closed position:

the first cable retaining protrusion and the second cable receiving slot define a first closed circular opening sized to receive a first cable;

the first cable receiving slot and the second cable retaining protrusion define a second closed circular opening sized to receive a second cable; and the first cap body and the second cap body define an internal cavity formed by a continuous perimeter wall extending in an axial direction of the first and second closed circular openings;

a first seal retainer extending from an underside of the first cable receiving slot and into the cavity in the axial direction; and a second seal retainer extending from an underside of the second cable receiving slot and into the cavity in the axial direction.

17. The seal cap of claim 16, wherein the first closed circular opening and the second closed circular opening are arranged on opposite sides of a part line defined between the first body and the second body in the closed position.

18. The seal cap of claim 16, wherein the first body comprises a plurality of first cable receiving slots and a plurality of first cable retaining protrusions, and the second body comprises a plurality of second cable receiving slots and a plurality of second cable retaining protrusions for defining a plurality of first closed circular openings and a plurality of second closed circular openings formed through the first and second bodies in the closed position, the first closed circular openings arranged in a first row and the second plurality of openings arranged in a second row.

19. The seal cap of claim 16, wherein the cavity defines an open end opposite the underside of the first cable receiving slot and the underside of the second cable receiving slot and adapted to receive a portion of the electrical connector, the first and second seal retainers extending in the axial direction toward the open end.

20. The seal cap of claim 16, wherein a central opening of the first seal retainer is aligned with the second closed circular opening and a central opening of the second seal retainer is aligned with the first closed circular opening, first seal retainer offset from the second closed circular opening in the axial direction, and the second seal retainer offset from the first closed circular opening in the axial direction.

* * * * *